(12) United States Patent
Bray (10) Patent No.: US 11,390,957 B2
(45) Date of Patent: Jul. 19, 2022

(54) ELECTRODE AND ELECTROCHEMICAL CELL COMPRISING THE SAME

(71) Applicant: Oxi-Tech Solutions Limited, Penryn (GB)

(72) Inventor: Patrick Simon Bray, Cornwall (GB)

( * ) Notice: Subject to any disclaimer, the term of this patent is extended or adjusted under 35 U.S.C. 154(b) by 46 days.

(21) Appl. No.: 16/464,618

(22) PCT Filed: Nov. 28, 2017

(86) PCT No.: PCT/GB2017/053582
§ 371 (c)(1),
(2) Date: May 28, 2019

(87) PCT Pub. No.: WO2018/100359
PCT Pub. Date: Jun. 7, 2018

(65) Prior Publication Data
US 2021/0017657 A1    Jan. 21, 2021

(30) Foreign Application Priority Data

Nov. 29, 2016 (GB) .................................. 1620164

(51) Int. Cl.
*C25B 11/043* (2021.01)
*C25B 9/19* (2021.01)
(Continued)

(52) U.S. Cl.
CPC ............. *C25B 11/043* (2021.01); *C25B 1/13* (2013.01); *C25B 9/19* (2021.01); *C25B 11/075* (2021.01)

(58) Field of Classification Search
CPC ...................................................... C25B 1/13
See application file for complete search history.

(56) References Cited

U.S. PATENT DOCUMENTS 5,657,365 A * 8/1997 Yamamoto ............. H01J 35/12
378/143
5,972,196 A    10/1999 Murphy et al.
(Continued)

FOREIGN PATENT DOCUMENTS

DE    102012020495 A1    4/2014
GB        2490912 A    11/2012
(Continued)

OTHER PUBLICATIONS

Fisher et al, Preparation and characterization of Ti/Diamond electrodes, Electrochemica Acta, vol. 44, No. 2-3, Sep. 1998, pp. 521-524 (Year: 1998).*
(Continued)

*Primary Examiner* — Harry D Wilkins, III (57) ABSTRACT

An electrode assembly for use in an electrochemical cell for the production of ozone from water is provided, the electrode assembly comprising an electrode body formed from a polycrystalline diamond, the electrode body comprising first and second opposing contact surfaces, the first contact surface for contacting a semi-permeable membrane; wherein the electrode assembly further comprises a first layer comprising an electrically conductive material, the first layer extending across at least a portion of the second contact surface of the electrode body. An electrochemical cell comprising the electrode assembly and its use in the production of ozone by the electrolysis of water is also provided.

14 Claims, 7 Drawing Sheets

(51) Int. Cl.
    *C25B 11/075*     (2021.01)
    *C25B 1/13*       (2006.01)

(56) References Cited

U.S. PATENT DOCUMENTS

| | | | |
|---|---|---|---|
| 2006/0261349 | A1 | 11/2006 | Doering et al. |
| 2009/0324810 | A1* | 12/2009 | Serikawa ............. C23C 16/271 427/78 |
| 2010/0006450 | A1 | 1/2010 | Whitehead et al. |
| 2010/0320082 | A1* | 12/2010 | Kato .................... C02F 1/4672 204/266 |
| 2011/0024767 | A1* | 2/2011 | Sung .................... H01L 21/568 257/77 |
| 2012/0138478 | A1 | 6/2012 | Yost, III et al. |
| 2012/0168302 | A1 | 7/2012 | Kato et al. |
| 2013/0327640 | A1* | 12/2013 | Mollart .............. G01N 33/0044 204/294 |
| 2015/0376804 | A1 | 12/2015 | Gorokhovsky et al. |

FOREIGN PATENT DOCUMENTS

| | | | | |
|---|---|---|---|---|
| JP | 2005336607 | A | 12/2005 | |
| JP | WO 2007/017976 | * | 2/2007 | ............. C25B 11/03 |
| JP | 2010037570 | A | 2/2010 | |
| JP | 2010270364 | A | 12/2010 | |
| JP | 2014095110 | A | 5/2014 | |
| WO | 2011066632 | A1 | 6/2011 | |

OTHER PUBLICATIONS

International Search Report, PCT/GB2017/053582, dated May 15, 2018, form PCT/ISA/210, 4 pages.

Patents Act 1977: Search Report under Section 17, Application No. GB1620164.2, dated Apr. 26, 2017, 2 pages.

* cited by examiner

ELECTRODE AND ELECTROCHEMICAL CELL COMPRISING THE SAME

The present invention relates to an electrode and to an electrochemical cell comprising the electrode. The electrode and the electrochemical cell are of advantage in the production of ozone by the electrolysis of water.

Electrochemical cells are well known and find use in a range of electrochemical applications. Electrodes for use in the electrochemical cells are also known. One such application for electrochemical cells is in the production of ozone from water by electrolysis. Electrochemical cells for the production of ozone from water generally comprise an anode and a cathode, with the anode and cathode being separated by a semi-permeable membrane, also referred to as a proton exchange membrane. The electrochemical production of ozone from water may be represented generally by the following formula:

$$3H_2O \rightarrow O_3 + 3H_2 \Delta H°_{298} = 207.5 \text{ kcal}$$

The reaction at the anode of the electrochemical cell may be represented by the following formula:

$$3H_2O \rightarrow O_3 + 6H^+ + 6e^-$$

An example of the electrochemical production of ozone from water and an electrochemical cell for such use is disclosed in U.S. Pat. No. 5,972,196 A.

Electrodes for use in electrochemical cells for the production of ozone from water are known in the art. For example, a perforated conductive diamond electrode for ozone generation by the electrolysis of water is disclosed in JP 2005-336607.

One recent disclosure of an electrode assembly is US 2010/0006450. This document discloses a diamond electrode and an electrolysis cell. US 2010/0006450 discloses an electrode comprising an electrically conducting diamond plate comprising at least one elongate aperture, in which the aperture edge length per unit working area of the diamond plate is greater than about 4 mm/mm². The electrode may consist essentially of a diamond plate. The diamond plate is preferably CVD diamond, with a preference for CVD polycrystalline diamond being expressed in US 2010/0006450. The apertures in the diamond electrode may be formed by laser cutting. Other techniques for forming the apertures disclosed include ion beam milling and plasma etching. There is also disclosed an alternative to using a diamond plate electrode. In particular, it is disclosed that an electrode assembly may be formed by coating an electrically conductive substrate with a conductive diamond layer. The substrate is formed with at least one elongate aperture. This arrangement is indicated to have the advantage of allowing a backing plate and flow channels to be incorporated into a single component. In addition, the use of a conductive diamond coating is stated to have cost advantages compared to a monolithic diamond plate.

An electrode assembly and an electrochemical cell comprising the same for use in the production of ozone from water is disclosed in GB 2490912.

JP 2010270364 discloses an apparatus and method for generating ozone from water.

DE 102012020495 discloses an electrolytic cell for use in the decomposition of water into hydrogen and oxygen in the form of ozone.

JP 2010037570 discloses a diamond electrode, a method for its production and an ozone-generating device comprising the same.

A diamond electrode, a method for its manufacture and an ozone generator employing the electrode is disclosed in JP 2014095110.

US 2015/0376804 discloses a diamond coated electrode and applications therefor.

An ozone generator is disclosed in US 2012/0168302.

An improved design for an electrode of an electrochemical cell has now been found. The improved electrode is of particular advantage when used in the electrochemical production of ozone from water.

According to a first aspect of the present invention, there is provided an electrode assembly for use in an electrochemical cell for the production of ozone from water, the electrode assembly comprising:

an electrode body formed from a polycrystalline diamond, the electrode body comprising first and second opposing contact surfaces, the first contact surface for contacting a semi-permeable membrane;

wherein the electrode assembly further comprises a first layer comprising an electrically conductive material, the first layer extending across at least a portion of the second contact surface of the electrode body.

The electrode assembly of the present invention comprises an electrode body. The electrode body is formed from polycrystalline diamond. The polycrystalline diamond may be formed using any suitable technique and such techniques are known in the art. More particularly, the electrode body is cut from a diamond wafer, for example by means of a laser. The diamond wafer may be formed using any suitable technique. A preferred technique for forming the diamond wafer is chemical vapour deposition (CVD). CVD techniques for forming diamond wafer are known in the art.

A particularly preferred diamond material is a doped diamond material, more preferably boron-doped diamond.

When forming the electrode body from a wafer formed by techniques, such as CVD, in which the wafer has a growth surface, the electrode body is preferably cut such that the growth surface forms one of the contact surfaces of the electrode body and the nucleation surface forms the other of the contact surfaces. Most preferably, the growth side forms the first contact surface of the electrode body and the nucleation side forms the second contact surface.

When installed in an electrolysis cell, the first contact surface of the electrode body is in contact with a semi-permeable membrane, as discussed in more detail hereinafter, and the electrode body is connected to a source of electrical current by a conductor. The electrode body of the present invention is provided with a layer of electrically conductive material on the second contact surface. In use, electrical current is supplied to the electrode body through the layer of electrically conductive material. It has been found that the distribution of electrical charge from the conductor along and across the electrode body is significantly improved by means of the layer of electrically conductive material and provides an improved and more even current density across the surface of the electrode body.

The electrically conductive material may be any suitable material that has a sufficient conductivity. A preferred conductive material for the said layer is a metal or mixture of metals. Preferably, the said layer comprises a metal that forms a bond with the sp³ carbon structure of the diamond material. A particularly preferred electrically conductive material is one comprising Titanium. Titanium forms a Ti—C bond with the sp³ carbon structure of the diamond material, in turn providing an improved distribution of current across the electrode body. Other metals that may be used include platinum (forming Pt—C bonds), tungsten (forming W—C bonds), tantalum (forming Ta—C bonds), niobium (forming Nb—C bonds), gold (forming Au—C bonds) and copper (forming Cu—C bonds). Other metals or mixtures of metals may be used, provided they are compatible with the physical properties of the boron doped diamond material, for example its thermal expansion properties.

In one preferred embodiment, the layer of electrically conductive material comprises two or more metals. Suitable metals for inclusion in the electrically conductive material include copper, silver and gold, and mixtures thereof. One preferred metal composition is a mixture of copper and silver or gold.

The electrode body may be provided with a single layer of conductive material or a plurality of layers of conductive material. In one preferred embodiment, the electrode body is provided with a first layer of a first conductive material adjacent the surface of the electrode body and a second layer of a second conductive material adjacent the surface of the first layer. In one preferred embodiment, the first layer consists essentially of a single metal. Titanium is a particularly preferred metal for forming the first layer. In one preferred embodiment, the second layer comprises a mixture of metals. An amalgam of copper and silver is one particularly preferred material for forming the second layer.

The one or more layers of electrically conductive material may be applied using any suitable technique. One particularly preferred technique is sputter deposition or sputter coating. Different sputter deposition techniques may be employed, with radio frequency (RF) sputter coating being preferred.

It has been found that applying the layer of electrically conductive material directly to the electrode body by sputter coating results in an improved adhesion between the electrically conductive material and the diamond of the electrode body, in turn improving the distribution of electrical current across the electrode body and the current density.

In embodiments in which the electrode body is cut from a diamond wafer having a growth surface, such as occurs when using CVD, the layer of electrically conductive material is preferably applied to the surface of the electrode body that is the nucleation side, (that is, not the surface corresponding to the growth side of the wafer).

The layer of electrically conductive material may have any suitable thickness. The layer of electrically conductive material is preferably at least 200 nm in thickness, more preferably at least 300 nm, still more preferably at least 400 nm, more preferably still at least 500 nm. A thickness of at least 600 nm is particularly preferred, especially at least 1000 nm. The layer may have a thickness of up to 10000 nm, more preferably up to 7500 nm. A thickness of at least 5000 nm is particularly suitable for many embodiments and provides for an improved current distribution and an even current density across the surface of the electrode body. In general, increasing the thickness of the layer of conductive material increases the electrical conductivity of the layer.

In embodiments comprising a plurality of layers of conductive material, the layer adjacent the surface of the electrode body is preferably relatively thin and the successive layer or layers relatively thick. In one preferred embodiment, the electrode body is provided with a first layer adjacent the surface of the electrode body and having a thickness of from 600 to 1000 nm, more preferably about 900 nm, and a second layer adjacent the surface of the first layer and having a thickness of from 2000 to 2500 nm, more preferably about 2400 nm.

The layer of electrically conductive material may extend across all or part of the second contact surface of the electrode body. Preferably, the layer of electrically conductive material extends over a major portion but not all of the second contact surface of the electrode body. More preferably, the layer of electrically conductive material extends over a major portion of the second contact surface of the electrode body, with a portion at an edge of the contact surface, preferably all edges of the major surface, not being covered by the conductive material, such that the diamond material is exposed. This edge portion may be at least 0.5 mm in width, that is the distance from the edge of the second contact surface of the electrode body to the edge of the layer of conductive material measured perpendicular to the edge. More preferably, the edge portion has a width of at least 1.0 mm. An edge portion having a width of 1.5 mm or greater is particularly preferred for many embodiments. An edge portion having a width of 2.0 mm or greater is also suitable for many embodiments.

In one preferred arrangement, the electrode assembly further comprises a second layer of an electrically insulating material extending over the first layer of an electrical conductive material. The second layer extends over the first layer and preferably covers the first layer. The first layer of electrically conductive material may comprise separate layers of one or more electrically conductive materials, as discussed above.

The second layer may comprise any suitable electrically insulating material. In one embodiment, the second layer comprises a material that is both electrically insulating and exhibits hydrophobic properties. Suitable materials for forming the second layer include nitrides. Suitable compounds for inclusion in the second layer are compounds of silicon, titanium, zirconium or hafnium. Preferred compounds for inclusion in the second layer are silicon nitride ($Si_3N_4$), titanium nitride (TiN), Zirconium nitride (ZrN) and hafnium nitride (HfN), or mixtures thereof. Anodised aluminium oxide may also be used as an electrically insulating material.

The second layer may be applied using any suitable technique. A preferred embodiment employs a material for the second layer that can be applied by sputter coating, for example the silicon, titanium, zirconium and hafnium nitrides mentioned above.

Alternatively, the second layer may comprise a resin, preferably a hydrophobic resin, more preferably a thermosetting hydrophobic resin. Examples of suitable resins include polyester resins and epoxy resins. The resin acts to seal the materials to which it is applied, such as the layers applied to the surface of the electrode body and, if appropriate, portions of the surface of the electrode body itself. The resin may also be employed to seal the conductor connection discussed in more detail below.

The electrode assembly may comprise a single layer of an electrically insulating material. Alternatively, two or more different insulating materials may be employed in two or more layers.

It has been found that the resin may exhibit a low adhesion to the surface of the electrically conducting material. Therefore, it is preferred to provide the electrode body with a layer of insulating material, as discussed above, and to coat the electrode body, including the insulating material, in a layer of resin.

Accordingly, in one preferred embodiment, the electrode assembly comprises a second layer extending across the first layer, the second layer comprising an electrically insulating material. The material of the second layer is preferably one that may be applied to the first layer by sputter coating. The material of the second layer preferably comprises a nitride.

Suitable insulating materials are compounds of silicon, titanium, zirconium and hafnium, in particular silicon nitride ($Si_3N_4$), titanium nitride (TiN), zirconium nitride (ZrN) and hafnium nitride (HfN), or mixtures thereof. Anodised aluminium oxide ($Al_2O_3$) may also be used as a material for one or more insulating layers.

In this embodiment, the electrode assembly comprises a third layer extending over the second layer, the third layer comprising a resin, preferably a hydrophobic resin, more preferably a thermosetting hydrophobic resin. Examples of suitable resins include polyester resins, polyimide resins and epoxy resins. The resin acts to seal the layers of conductive material and insulating material. The resin may also be employed to seal the conductor connection, discussed in more detail below. One particularly preferred resin material is a polyimide resin, for example a polyimide resin film. Such polyimide resins are commercially available, for example the Kapton® products from Du Pont™.

As noted above, the electrode body is connected in use to a supply of electrical current by a suitable conductor. An advantage of the electrode assembly of the present invention is that a conductor connector terminal may readily be connected to the electrically conducting material of the first layer. The layer of electrically conductive material preferably has a composition that allows the terminal to be connected to the layer by soldering. Preferably, the terminal is coated in a resin, as described hereinbefore.

The electrical conductor, such as a cable, may be connected to the conductor connector terminal. Again, this connection is preferably formed by soldering.

The electrode body may be of any suitable shape and configuration. In one embodiment, the electrode body is plate-like, that is having opposing major surfaces, forming the first and second contact surfaces, extending between opposing edge surfaces of the electrode body.

In a preferred embodiment, the electrode body is elongate and has a longitudinal axis. The longitudinal axis discussed herein is the central longitudinal axis of the elongate electrode body. In this respect, the term 'elongate' is a reference to the length of the electrode body being greater than the width of the electrode. In use, when the electrode assembly is incorporated into an electrochemical cell and the cell is operated, water may be caused to flow over or otherwise contact the electrode body. In use, the electrode body is preferably arranged to extend with its longitudinal axis generally parallel to the general direction of any flow of the water through the cell.

The ratio of the length of the electrode body to the width of the electrode body may be any suitable ratio. In this respect, the ratio of the length of the electrode body to its width is a reference to the ratio of the length to the width of the body at its widest point, measured across a major surface of the electrode body from one edge surface to the opposite edge surface perpendicular to the longitudinal axis. The ratio is preferably at least 2, more preferably at least 3, still more preferably at least 4. A ratio of at least 5 is preferred, still more preferably at least 6. In a preferred embodiment, the ratio of the length of the electrode body to the width of the electrode body is in the range of from 2 to 12, more preferably from 3 to 10, still more preferably from 4 to 8. A ratio of about 6 to 7 has been found to be particularly suitable for many embodiments.

As noted above, the electrode body preferably has opposing major surfaces extending between opposing edge surfaces and forming the first and second contact surfaces. The relative dimensions of the electrode body are such that the body is an elongate plate, that is the width of the major surfaces is significantly greater than the width of the edge surfaces. In this respect, the width of the edge surface can be considered to be the thickness of the electrode body. Preferably, the ratio of the width of each major surface, that is the width of the major surface at its widest point measured across the major surface from one edge surface to the opposite edge surface perpendicular to the longitudinal axis, to the width of the edge surface is at least 2, preferably at least 4, more preferably at least 5, still more preferably at least 6, more preferably still at least 8. In a preferred embodiment, the ratio of the width of each major surface to the width of the edge surfaces is at least 10. In a preferred embodiment, the ratio is in the range of from 2 to 25, more preferably from 4 to 20, still more preferably from 6 to 18, more preferably still from 8 to 15. A ratio of about 12 has been found to be particularly suitable for many embodiments.

Similarly, the ratio of the length of the electrode body to the width of the edge surface is at preferably least 10, more preferably at least 20, still more preferably at least 30, more preferably still at least 40, in particular more preferably at least 50. In a preferred embodiment, the ratio of the width of each major surface to the width of the edge surfaces is at least 60. In a preferred embodiment, the ratio is in the range of from 10 to 150, more preferably from 30 to 130, still more preferably from 50 to 120, more preferably still from 60 to 100. A ratio of from 70 to 90, more particularly about 80, has been found to be particularly suitable for many embodiments.

The dimensions of the electrode body are selected according to the required duty of the electrode and the electrolytic cell in which it is used. In particular, the dimensions of the electrode may be selected to provide the required current efficiency. In the case of the electrode assembly of the present invention, the current efficiency is a function of the ratio of the length of the edges of the electrode body exposed to liquid being electrolysed, in particular water, to the surface area of the electrode body. In general, a higher ratio of edge length to surface area of the electrode body results in a higher current efficiency of the electrode assembly when in use.

Preferably, the ratio of the total length of the edges of the electrode body to the surface area of the electrode body is at least 0.1, more preferably a least 0.2, still more preferably at least 0.25, more preferably still at least 0.3. A ratio of up to 2.5 can be provided, preferably up to 2.0, more preferably up to 1.5. A ratio in the range of from 0.1 to 2.5, preferably from 0.2 to 2.0, more preferably from 0.25 to 1.75, still more preferably from 0.3 to 1.6, especially from 0.3 to 1.5 is preferred. A ratio of from 0.35 to 1.4 is particularly suitable for many embodiments.

The ratio of the total length of the edges of the electrode body to the surface area of the electrode body may vary according to the size of the electrode. Examples of the dimensions and ratio for different sizes of electrode are summarised in the following table.

| Electrode Dimensions (mm × mm) | Edge Length (mm) | Electrode Area (mm$^2$) | Ratio EL/EA (mm$^{-1}$) |
|---|---|---|---|
| 3 × 3 | 12 | 9 | 1.33 |
| 5 × 5 | 20 | 25 | 0.80 |
| 5 × 10 | 30 | 50 | 0.60 |
| 5 × 20 | 50 | 100 | 0.50 |
| 6 × 40 | 92 | 240 | 0.38 |

As noted above, the dimensions of the electrode body are selected according to the duty to be performed when in use. In addition, the dimensions of the electrode body may be determined by the construction of the electrode body and its method of manufacture. For many applications, the electrode body is preferably at least 3 mm in length, more preferably 5 mm in length, more preferably at least 10 mm, still more preferably at least 20 mm, more preferably still at least 30 mm. The maximum electrode body length may be limited by the construction and method of manufacture. Lengths of up to 200 mm may be employed, for example up to 150 mm. In the case of one preferred embodiment, in which the electrode body is cut from a wafer of solid diamond material prepared by chemical vapour deposition (CVD), the maximum length of the electrode body is up to about 140 mm. For many embodiments, a length of from 30 to 50 mm, in particular from 35 to 45 mm, for example about 40 mm, is particularly suitable.

The width of the electrode body, that is the width of the major surfaces of the body between opposing edge surfaces at its widest point, is preferably at least 1 mm, more preferably at least 2 mm, still more preferably at least 3 mm. A width of up to 20 mm, preferably up to 15 mm, more preferably up to 10 mm is particularly suitable for many embodiments. For many embodiments, a length of from 2 to 12 mm, preferably from 3 to 10 mm, more preferably from 4 to 8 mm is particularly suitable, for example from 5 to 7 mm, such as about 6 mm.

The width of the edge surfaces is preferably at least 0.1 mm, more preferably at least 0.2 mm, still more preferably at least 0.3 mm. A width of up to 2 mm may be employed, for example up to 1.5 mm or up to 1 mm. A width of from 0.1 to 1 mm has been found to be particularly suitable for many embodiments, preferably from 0.2 to 0.8 mm, more preferably from 0.3 to 0.7 mm, still more preferably from 0.4 to 0.6 mm, such as about 0.5 mm.

In one preferred embodiment, the electrode assembly comprises an electrode body having an elongate electrode body having first and second opposing edge surfaces and opposing first and second major faces extending between the first and second opposition edge surfaces;
wherein the electrode body has an elongate longitudinal axis; wherein the electrode body comprises:
a first body portion having a first width measured in a direction perpendicular to the longitudinal axis and between the longitudinal axis and the first edge surface across the first and second opposing major surfaces; and
a second body portion having a second width measured in a direction perpendicular to the longitudinal axis and between the longitudinal axis and the first edge surface across the first and second opposing major surfaces;
wherein the second width is greater than the first width.

It has been found that the form of the electrode body of this embodiment promotes the mass transfer of ozone away from the electrode bodies, in turn further increasing the efficiency and productivity of the electrochemical cell.

The first and second body portions of the electrode body may have any suitable cross-sectional shape. Preferably, the first and second body portions have the same general cross-sectional shape, with the dimensions of the portions differing, as noted above. A preferred cross-sectional shape is rectangular.

As noted above, the electrode body of this embodiment comprises first and second body portions, in which the first body portion has a first width and the second body portion has a second width, with the second width being greater than the first width. In this respect, the first and second widths are each measured in a direction perpendicular to the longitudinal axis of the electrode body and between the longitudinal axis and the first edge surface across the first and second opposing major surfaces.

The first and second body portions may be asymmetrical about the longitudinal axis. For example, a first body portion on one side of the longitudinal axis may be opposite a second portion on the opposite side of the longitudinal axis. More preferably, at least one, more preferably both, of the first and second portions are arranged symmetrically about the longitudinal axis of the electrode body. More particularly, a first body portion on one side of the longitudinal axis is preferably opposite a first body portion on the opposite side of the axis and/or a second body portion one side of the longitudinal axis is preferably opposite a second body portion on the opposite side of the longitudinal axis. More preferably, each body portion on one side of the longitudinal axis is opposite a body portion of the same type on the other side of the longitudinal axis.

The first body portion is preferably adjacent the second body portion.

As noted, the width of the second body portion is greater than the width of the first body portion. In this respect, the widths of the body portions are references to the width at the widest point of the said body portion. The ratio of the width of the second body portion to the width of the first body portion is preferably at least 1.1, more preferably at least 1.2, still more preferably at least 1.3, more preferably still at least 1.4. A ratio of at least 1.5 is more preferred, more preferably at least 1.6, still more preferably at least 1.7, more preferably still at least 1.8, for example at least 1.9. A ratio of the width of the second body portion to the width of the first body portion is preferably 2.0 or greater.

The electrode body may comprise one or more first body portions and one or more second body portions. Preferably, the electrode body comprises a plurality of first body portions and a plurality of second body portions, more preferably with the first and second body portions arranged in an alternating pattern along the length of the electrode body.

The first and second body portions may have any suitable shape, that is the shape of the first and second major surfaces of the body portion. For example, the first and/or second body portions may have a rounded shape, that is with the edges of the first and second major surfaces extending in an arc. More preferably, the first and/or second body portions are angular in shape, that is the edges of the first and second major surfaces extend in a plurality of straight lines, each straight line extending at an angle to an adjacent straight line. For example, the first and/or second body portions may comprise an edge having two straight lines, forming a generally triangular form. More preferably, the first and/or second body portions have a generally rectangular shape.

Preferably, the first and second body portions have the same general shape.

In embodiments in which the electrode body comprises a plurality of first and/or second body portions, the plurality of first body portions are preferably of the same shape and size and/or the plurality of second body portions are preferably of the same shape and size.

The electrode body may be asymmetrical about the longitudinal axis. More preferably, the electrode body is symmetrical about the longitudinal axis.

In a further aspect, the present invention provides an electrochemical cell comprising:
a first electrode;
a second electrode; and
a semi-permeable membrane extending between and in contact with the first electrode and the second electrode;
wherein one or both of the first and second electrodes comprises an electrode assembly as hereinbefore described.

Most preferably, both the first and second electrodes comprise an electrode assembly as hereinbefore described. The first and second electrodes may comprise electrode bodies of different shapes and/or different sizes. Most preferably, the electrode body of the first electrode is substantially the same shape and size as the electrode body of the second electrode.

The semi-permeable membrane functions as a cation exchange membrane and is also referred to as a proton exchange membrane (PEM) when the electrochemical cell is in use, selectively allowing the passage of certain cations and protons (hydrogen ions) from one of the first and second electrodes to the other of the first and second electrodes, depending upon the polarity of operation of the cell, that is from the anode to the cathode, while preventing the passage of anions.

Suitable materials for forming the semi-permeable membrane are known in the art and are commercially available. Particularly preferred materials for forming the semi-permeable membrane are fluropolymers, in particular chemically stabilized perfluorosulfonic acid/PTFE copolymers. Such materials are commercially available under the trade name Nafion® (ex. Du Pont), for example.

The semi-permeable proton exchange membrane (PEM) extends between the first and the second electrode, in particular between the first contact surface of the first electrode and the first contact surface of the second electrode, and is preferably in contact with both electrodes. During operation of the cell, in particular in the electrolysis of water to produce ozone, the production of ozone occurs along the edges of the electrodes at the interface between the electrode forming the anode, the semi-permeable membrane and water. It has been found that the electrode assembly of the present invention exhibits a high efficiency in the production of ozone at the aforementioned interface.

It is preferred that the semi-permeable proton exchange membrane (PEM) extends across the entire opposing major surfaces of the electrode bodies of the first and second electrodes. More preferably, the semi-permeable proton exchange membrane both extends across the entire opposing major surfaces of the electrode bodies of the first and second electrodes and extends therebeyond at some, most preferably at all, edges of the electrode body. Preferably, the semi-permeable proton exchange membrane extends beyond the edges of the electrode bodies by at least 1.0 mm, more preferably at least 2.0 mm, still more preferably at least 3.0 mm, more preferably still at least 5.0 mm.

In a further aspect, the present invention provides a method for the production of ozone by the electrolysis of water, the method comprising:
providing an electrochemical cell as hereinbefore described;
supplying an electrical current to the first and second electrodes of the electrochemical cell; and
providing water to the interfaces between the semi-permeable membrane and the first and second electrodes.

In the method of the present invention, water is ozonated, that is provided with a concentration of ozone. Water ozonated in this way finds use in a range of applications, including disinfection and sanitisation.

The electrochemical cell may be immersed in a body of water, for example water to be ozonated. Alternatively, the water may be provided as a stream of water to flow along the electrode bodies of the first and second electrodes. For example, the electrochemical cell may be disposed in a conduit along which water is caused to flow.

In a still further aspect, the present invention provides the use of an electrochemical cell as hereinbefore described in the production of ozone by the electrolysis of water.

Embodiments of the present invention will now be described, by way of example of only, having reference to the accompanying drawings, in which.

Figure 1:
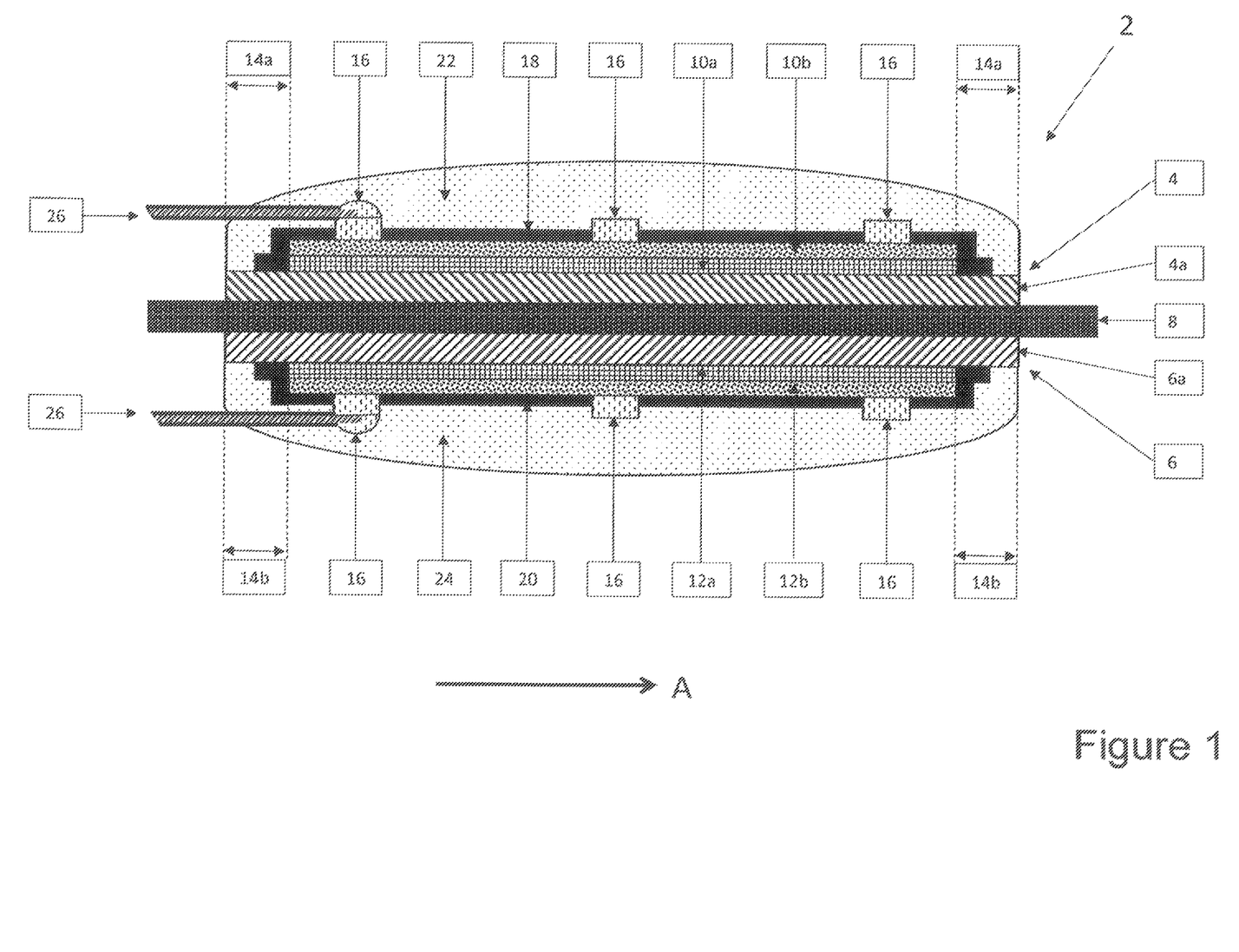
FIG. 1 is a cross-sectional view of an electrochemical cell comprising an electrode assembly according to one embodiment of the present invention.

Turning first to FIG. 1, there is shown a cross-sectional view of an electrochemical cell according to one embodiment of the present invention. The electrochemical cell, generally indicated as 2, comprises a first electrode assembly 4 having an electrode body 4a and a second electrode assembly 6 having an electrode body 6a.

Each electrode body 4a, 4b is formed from a polycrystalline Boron-doped diamond (BDD), in particular cut from a wafer of the diamond material by a laser. The BDD material may be formed using any suitable technique, in particular CVD. Diamond material of this kind is available commercially. When prepared using a technique such as CVD, the diamond material has a growth face and a nucleation face, which form the major surfaces of the electrode body.

A semi-permeable proton exchange membrane 8 extends between the first and second electrode assemblies 4, 6 and is in contact with a major surface of the electrode body 4a, 6a of each electrode assembly 4, 6. The membrane 8 preferably contacts the growth face of the electrode bodies 4a, 6a. The membrane 8 is formed from a material that allows for the polarity of the cell to be reversed, in particular Nafion® type N117. As shown in FIG. 1, the membrane 8 extends beyond the edge of each electrode body 4a, 6a.

The major surface of each electrode body 4a, 6a not covered by the membrane 8, that is the nucleation face of the electrode body, is provided with a respective first layer 10a, 12a of an electrically conductive material, in particular a layer of Titanium (Ti), and a second layer 10b, 12b of a second electrically conductive material, in particular a layer of an alloy of Copper (Cu) and Silver (Ag). The layers of electrically conductive material are applied to each electrode body by sputter coating. As shown in FIG. 1, an edge portion 14a, 14b of each electrode body is not covered by the electrically conductive layer 10a, 10b, 12a, 12b and is exposed. The layers of electrically conductive material 10, 12 total about 5000 nm in thickness. The layers of the alloy of Copper and Silver may be replaced with a layer consisting essentially of Copper having a thickness of about 300 μm.

A Copper cable connector terminal 16 is soldered to each layer 10b, 12b of the Copper-Silver electrically conductive material.

The exposed surface of each layer of electrically conductive material 10, 12 is coated in a layer of electrically insulating material 18, 20, in particular Silicon Nitride ($Si_3N_4$). The layer of electrically insulating material 18, 20 is applied to the layer of electrically conductive material 10, 12 by sputter coating and has a thickness of up to 1000 nm. The layer of electrically insulating material overlaps the layers 10b, 12b of electrically conducting material, as shown in FIG. 1.

A layer of thermosetting hydrophobic resin 22, 24 is provided on each layer of electrically insulating material 18, 20. The resin is most preferably a polyimide resin, with alternatives being a polyester resin or an epoxy resin. The layer 22, 24 of resin material has a thickness between 1 mm and 3 mm.

The layer of electrically insulating material 18, 20 may be omitted, in which case the layer of resin 22, 24 is provided directly onto the surface of the layer of electrically conductive material 10b, 12b.

It has been found that the resin adheres more readily to the metallised surfaces 10b, 12b after the Copper cable connector terminals 16 have been soldered in position.

Current feed cables 26 are connected to respective cable connector terminals 16 by soldering, to provide an electric current to the respective layers of electrically conductive material 10, 12 and to the electrode body 4a, 6a.

The electrochemical cell 2 of FIG. 1 is particularly suitable for use in the electrolysis of water to produce ozone. In use of the electrochemical cell 2, water is caused to flow over the assembly in the direction indicated by the arrow A in FIG. 1. When an electrical current is applied by way of the current feed cables 26 from a suitable source of electrical power, one of the electrode assemblies 4, 6 operates as the anode and the other assembly 6, 4 as the cathode, depending upon the polarity of the supplied current. Ozone is produced at the edges of the electrode body 4a, 6a of the anode at the interface between the electrode body 4a, 6a, the membrane 8 and the surrounding water. In operation, the polarity of the cell is periodically reversed, to prevent the accumulation of deposits on the electrode bodies.

Figure 2:
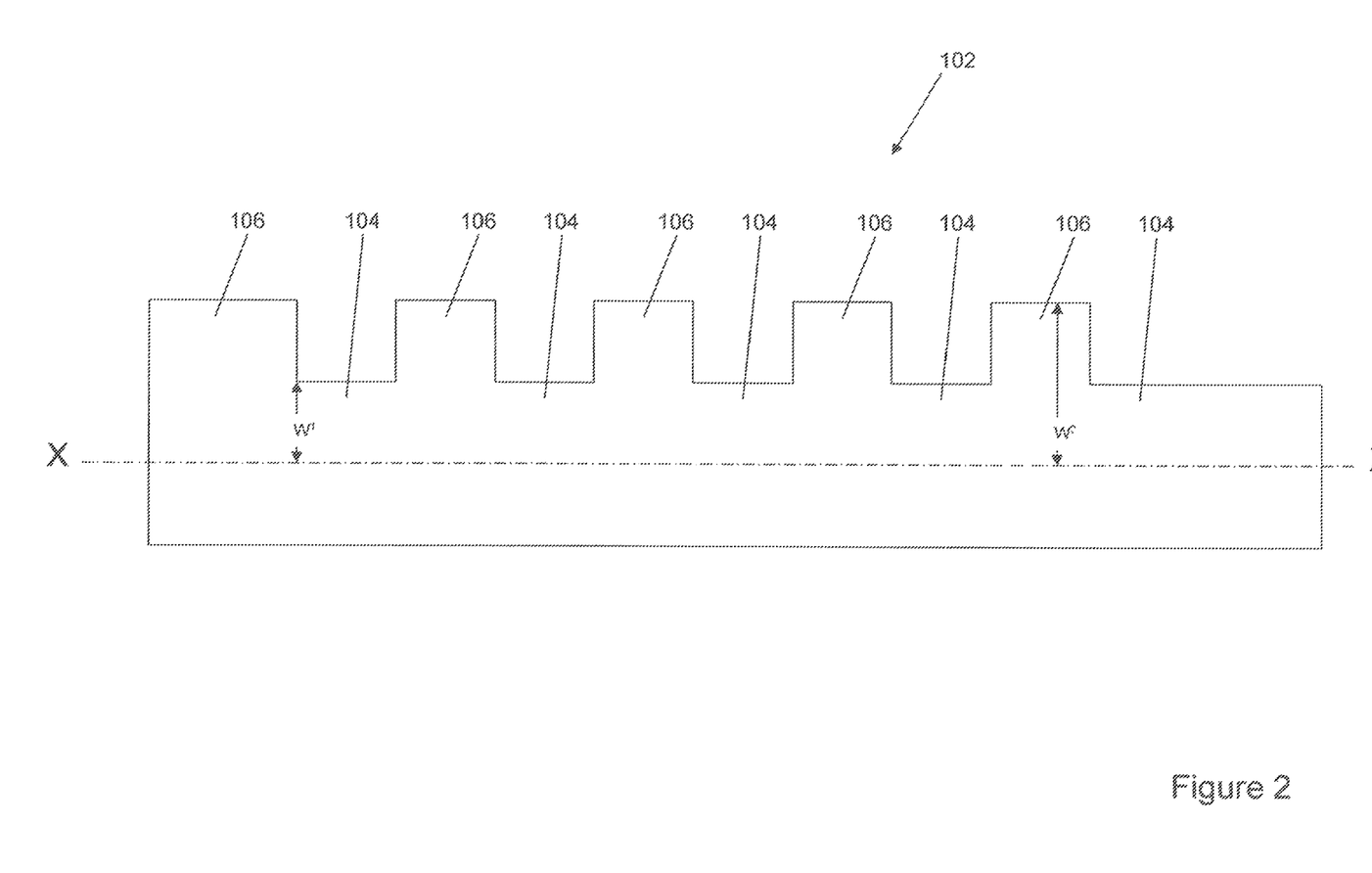
FIG. 2 is a plan view of an electrode assembly according to one embodiment of the present invention.

Turning to FIG. 2, there is shown a plan view of an electrode body according to one embodiment of the present invention. The electrode body, generally indicated as 102, is as described above with respect to FIG. 1. The electrode body 102 is elongate, having a length at least six times its width. The electrode body 102 has a longitudinal axis X-X and comprises a plurality of first body portions 104. Each of the first body portions 104 has a first width $w^1$ measured from the longitudinal axis X-X to the edge of the electrode body 102 perpendicular to the longitudinal axis, as indicated in FIG. 2. The electrode body 102 further comprises a plurality of second body portions 106. Each of the second body portions 106 has a second width $w^2$ measured from the longitudinal axis X-X to the edge of the electrode body 102 perpendicular to the longitudinal axis, as indicated in FIG. 2. The second width $w^2$ is greater than the first width $w^1$. For example, for an electrode body having a total length of 40 mm, the width $w^2$ may be 3 mm and the width $w^1$ 1.5 mm.

The first and second body portions 104, 106 are shown in FIG. 2 to have generally rectangular configurations, with the edges of the body portions being straight. Alternatively, the edges of the body portions 104, 106 may be curved. The corners of the body portions 104, 106 may be rounded.

The electrode body 102 of FIG. 2 has the first body portions 104 and the second body portions 106 arranged in an alternating pattern along the length of the electrode body on side of the longitudinal axis X-X. The electrode body is asymmetrical about the longitudinal axis X-X.

Figure 3:
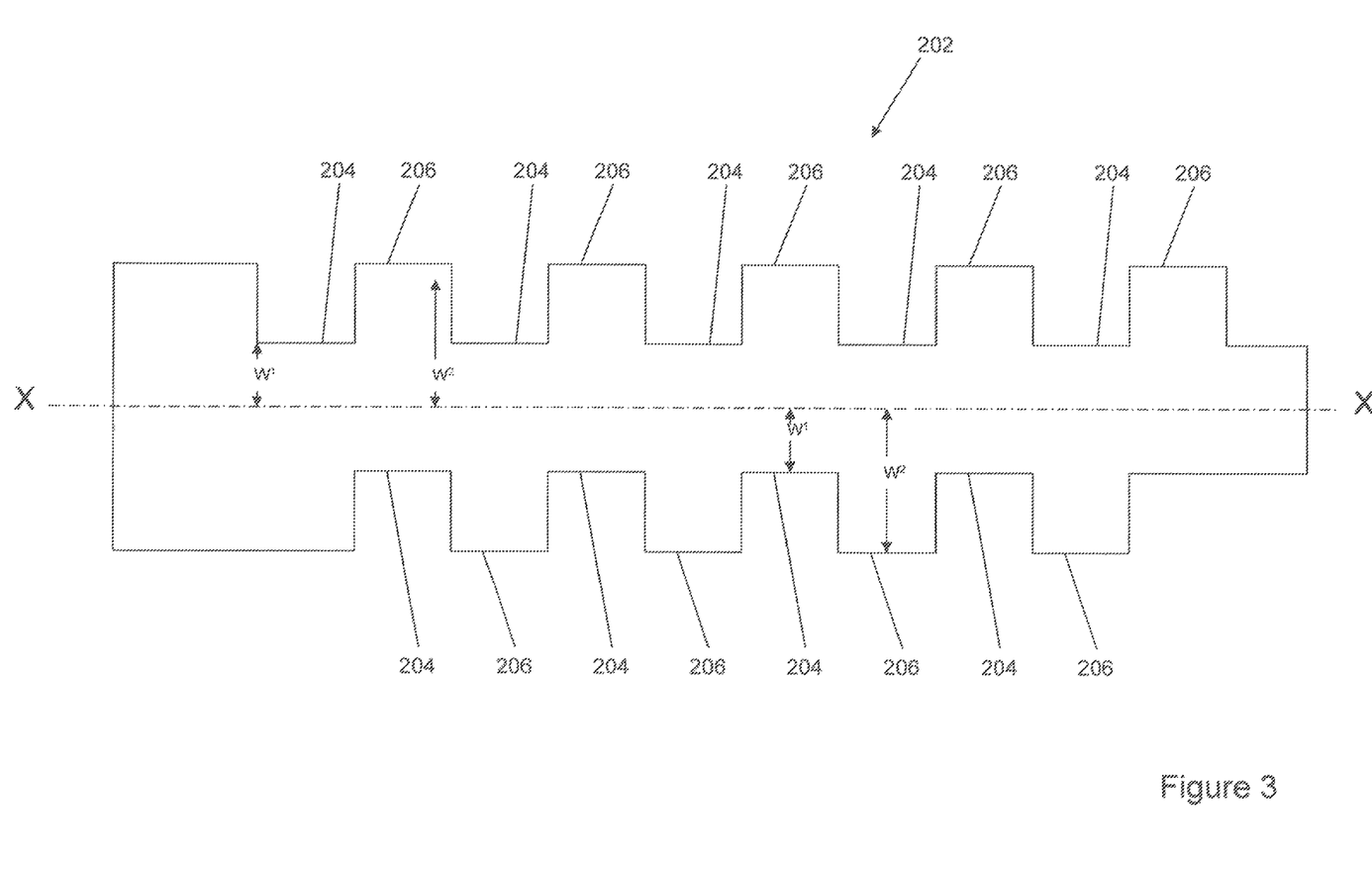
FIG. 3 is a plan view of an electrode assembly according to a further embodiment of the present invention.

Turning to FIG. 3, there is a shown a plan view of an electrode body of an alternative embodiment of the present invention. The electrode body, generally indicated as 202, is as described above with respect to FIG. 1. The electrode body 202 is elongate, having a length at least six times its width. The electrode body 202 has a longitudinal axis X-X and comprises a plurality of first body portions 204. Each of the first body portions 204 has a first width $w^1$ measured from the longitudinal axis X-X to the edge of the electrode body 202 perpendicular to the longitudinal axis, as indicated in FIG. 3. The electrode body 202 further comprises a plurality of second body portions 206. Each of the second body portions 206 has a second width $w^2$ measured from the longitudinal axis X-X to the edge of the electrode body 202 perpendicular to the longitudinal axis, as indicated in FIG. 3. The second width $w^2$ is greater than the first width $w^1$. For example, for an electrode body having a total length of 40 mm, the width $w^2$ may be 3 mm and the width $w^1$ 1.5 mm.

The electrode body 202 of FIG. 3 has the first body portions 204 and the second body portions 206 arranged in an alternating pattern along the length of the electrode body on both sides of the longitudinal axis X-X. The first and second body portions 204, 206 on one side of the longitudinal axis X-X are staggered with respect to the first and second body portions 204, 206 on the opposite side of the longitudinal axis, that is a first portion 204 on one side of the axis is opposite a second portion 206 on the other side of the axis. The electrode body 202 is asymmetrical about the longitudinal axis X-X.

The first and second body portions 204, 206 are shown in FIG. 3 to have generally rectangular configurations, with the edges of the body portions being straight. Alternatively, the edges of the body portions 204, 206 may be curved. The corners of the body portions 204, 206 may be rounded.

Figure 4:
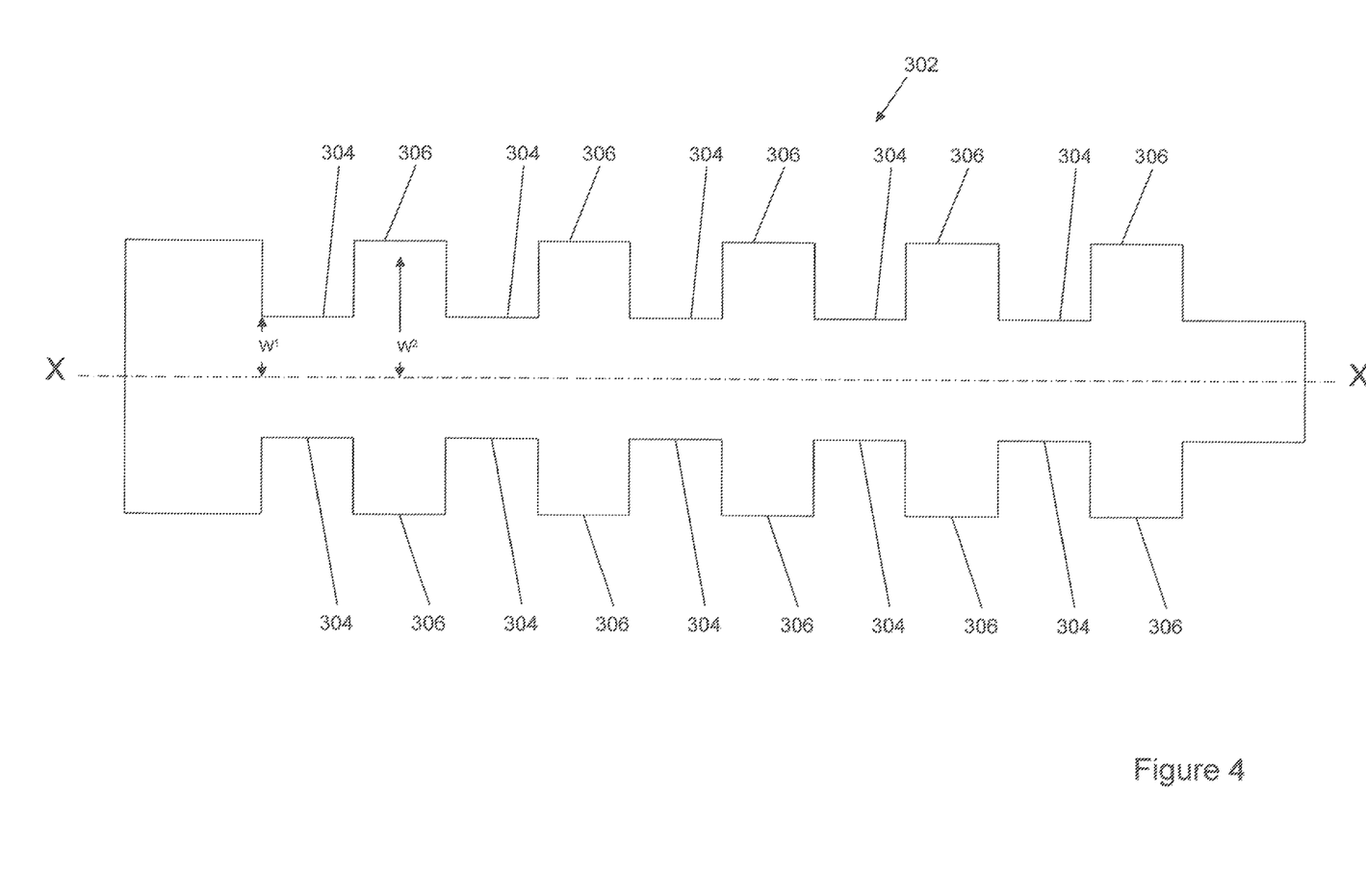
FIG. 4 is a plan view of an electrode assembly according to a further embodiment of the present invention.

Turning to FIG. 4, there is a shown a plan view of an electrode body of an alternative embodiment of the present invention. The electrode body, generally indicated as 302, is as described above with respect to FIG. 1. The electrode body 302 is elongate, having a length at least six times its width. The electrode body 302 has a longitudinal axis X-X and comprises a plurality of first body portions 304. Each of the first body portions 304 has a first width $w^1$ measured from the longitudinal axis X-X to the edge of the electrode body 302 perpendicular to the longitudinal axis, as indicated in FIG. 4. The electrode body 302 further comprises a plurality of second body portions 306. Each of the second body portions 306 has a second width $w^2$ measured from the longitudinal axis X-X to the edge of the electrode body 302 perpendicular to the longitudinal axis, as indicated in FIG. 4. The second width $w^2$ is greater than the first width $w^1$. For example, for an electrode body having a total length of 40 mm, the width $w^2$ may be 3 mm and the width $w^1$ 1.5 mm.

The electrode body 302 of FIG. 4 has the first body portions 304 and the second body portions 306 arranged in an alternating pattern along the length of the electrode body on both sides of the longitudinal axis X-X. The first and second body portions 304, 306 on one side of the longitudinal axis X-X are positioned along the length of the electrode body the same as the first and second body portions 304, 306 on the opposite side of the longitudinal axis, that the first and second portions 304, 306 on one side of the axis are opposite respective first and second portions 304, 306 on the other side of the axis. The electrode body 302 is symmetrical about the longitudinal axis X-X.

The first and second body portions 304, 306 are shown in FIG. 4 to have generally rectangular configurations, with the edges of the body portions being straight. Alternatively, the edges of the body portions 304, 306 may be curved. The corners of the body portions 304, 306 may be rounded.

Figure 5:
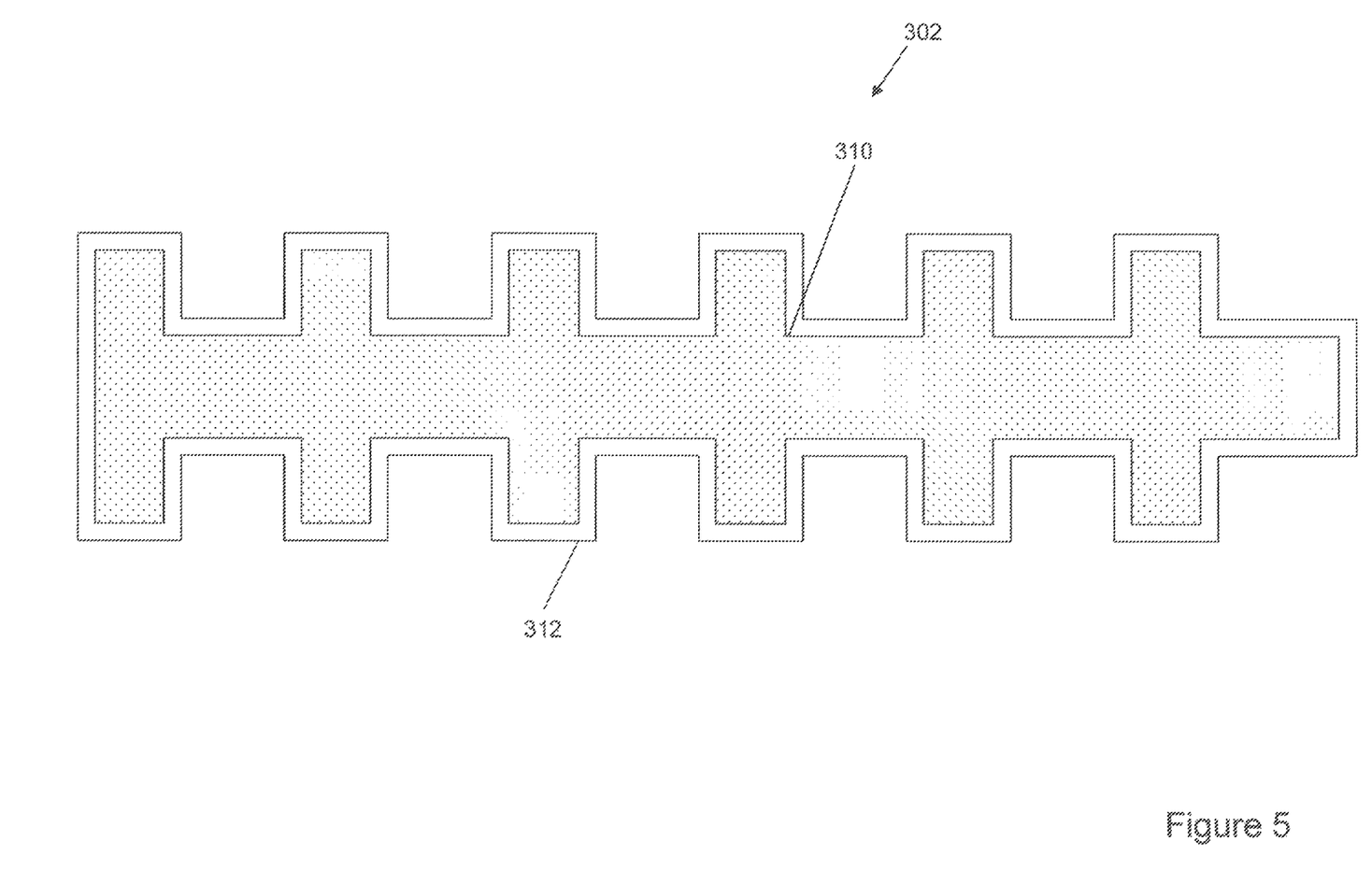
FIG. 5 is a plan view of the electrode assembly of FIG. 4 with a layer of electrically conductive material applied to the electrode body.

Referring now to FIG. 5, there is shown a plan view of the electrode body 302 of FIG. 4, bearing a layer of electrically conductive material 310. The layer of electrically conductive material 310 is as described above with respect to FIG. 1. As shown in FIG. 5, the layer 310 extends over a major surface of the electrode body 302 and covers a major portion of the surface. An edge portion 312 of the surface of the electrode body 302 is left uncovered, such that the BDD diamond material of the electrode body 302 is exposed at the edge portion.

Figure 6:
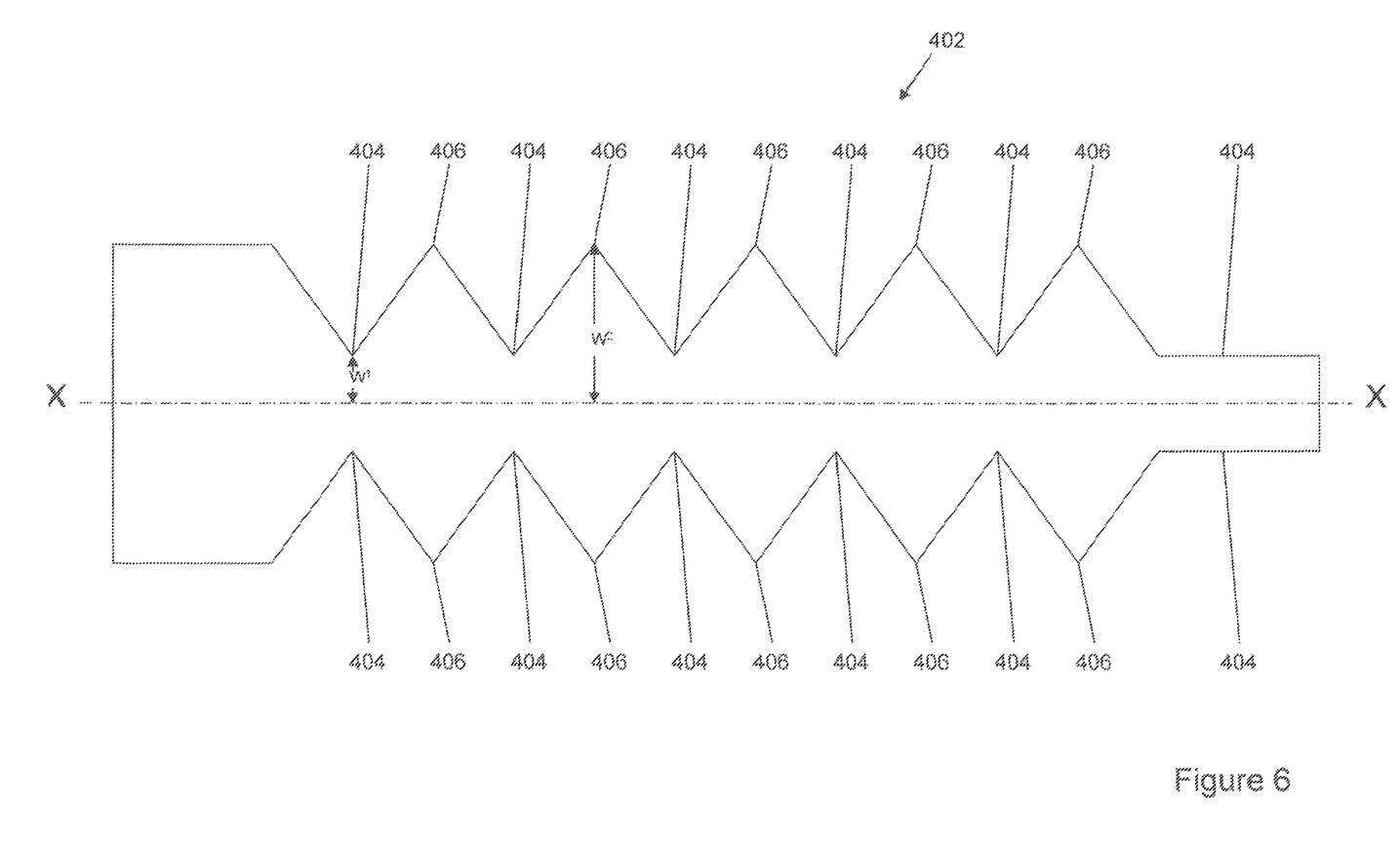
FIG. 6 is a plan view of an electrode assembly according to a still further embodiment of the present invention.

Turning to FIG. 6, there is a shown a plan view of an electrode body of an alternative embodiment of the present invention. The electrode body, generally indicated as 402, is as described above with respect to FIG. 1. The electrode body 402 is elongate, having a length at least six times its width. The electrode body 402 has a longitudinal axis X-X and comprises a plurality of first body portions 404. Each of the first body portions 404 has a first width $w^1$ measured from the longitudinal axis X-X to the edge of the electrode body 402 perpendicular to the longitudinal axis, as indicated in FIG. 6. The electrode body 402 further comprises a plurality of second body portions 406. Each of the second body portions 406 has a second width $w^2$ measured from the longitudinal axis X-X to the edge of the electrode body 402 perpendicular to the longitudinal axis, as indicated in FIG. 6. The second width $w^2$ is greater than the first width $w^1$. For example, for an electrode body having a total length of 40 mm, the width $w^2$ may be 3 mm and the width $w^1$ 1.5 mm.

The electrode body 402 of FIG. 6 has the first body portions 404 and the second body portions 406 arranged in an alternating pattern along the length of the electrode body on both sides of the longitudinal axis X-X. The first and second body portions 404, 406 on one side of the longitudinal axis X-X are positioned along the length of the electrode body the same as the first and second body portions 404, 406 on the opposite side of the longitudinal axis, that the first and second portions 404, 406 on one side of the axis are opposite respective first and second portions 404, 406 on the other side of the axis. The electrode body 402 is symmetrical about the longitudinal axis X-X.

The first and second body portions 404, 406 are shown in FIG. 6 to form a generally triangular configuration, with the edges of the body portions being straight. Alternatively, the edges of the body portions 404, 406 may be curved. The corners of the body portions 404, 406 may be rounded.

Figure 7:
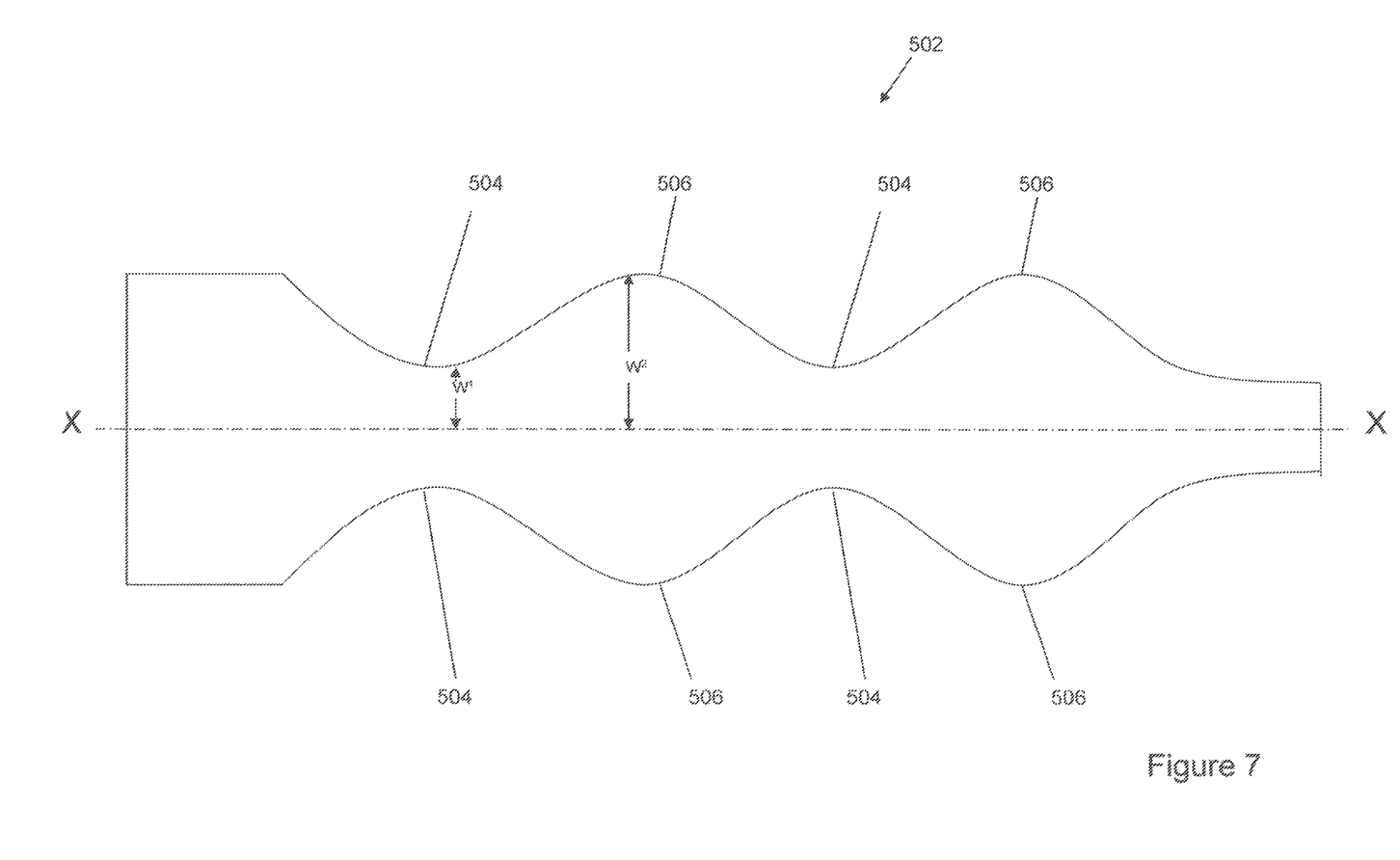
FIG. 7 is a plan view of an electrode assembly according to a yet further embodiment of the present invention.

Finally, turning to FIG. 7, there is a shown a plan view of an electrode body of an alternative embodiment of the present invention. The electrode body, generally indicated as 502, is as described above with respect to FIG. 1. The electrode body 502 is elongate, having a length at least six times its width. The electrode body 502 has a longitudinal axis X-X and comprises a plurality of first body portions 504. Each of the first body portions 504 has a first width $w^1$ measured from the longitudinal axis X-X to the edge of the electrode body 502 perpendicular to the longitudinal axis, as indicated in FIG. 7. The electrode body 502 further comprises a plurality of second body portions 506. Each of the second body portions 506 has a second width $w^2$ measured from the longitudinal axis X-X to the edge of the electrode body 502 perpendicular to the longitudinal axis, as indicated in FIG. 7. The second width $w^2$ is greater than the first width $w^1$. For example, for an electrode body having a total length of 40 mm, the width $w^2$ may be 3 mm and the width $w^1$ 1.5 mm.

The electrode body 502 of FIG. 7 has the first body portions 504 and the second body portions 506 arranged in an alternating pattern along the length of the electrode body on both sides of the longitudinal axis X-X. The first and second body portions 504, 506 on one side of the longitudinal axis X-X are positioned along the length of the electrode body the same as the first and second body portions 504, 506 on the opposite side of the longitudinal axis, that the first and second portions 504, 506 on one side of the axis are opposite respective first and second portions 504, 506 on the other side of the axis. The electrode body 502 is symmetrical about the longitudinal axis X-X.

The first and second body portions 504, 506 are shown in FIG. 7 to be generally curved and to form a generally sinusoidal pattern extending along each side of the longitudinal axis.

The invention claimed is:

1. An electrode assembly for use in an electrochemical cell for the production of ozone from water, the electrode assembly comprising:
   an electrode body formed from a polycrystalline diamond, wherein the electrode body is cut from a diamond wafer, the electrode body comprising first and second opposing contact surfaces, the first contact surface for contacting a semi-permeable membrane;
   wherein the electrode assembly further comprises a first layer comprising an electrically conductive material, the first layer extending across at least a portion of the second contact surface of the electrode body; and
   wherein the electrode body is provided with at least one layer of insulating material over the at least one layer of electrically conducting material, wherein the insulating material comprises a metal nitride or silicon nitride.

2. The electrode assembly according to claim 1, wherein the diamond is boron-doped diamond (BDD).

3. The electrode assembly according to claim 1, wherein the electrically conductive material comprises a metal selected from the group consisting of titanium, platinum, tungsten, tantalum, niobium, copper, silver, gold and mixtures thereof.

4. The electrode assembly according to claim 1, wherein the second contact surface of the electrode body is provided with a first layer of a first electrically conductive material and a second layer of a second electrically conductive material.

5. The electrode assembly according to claim 4, wherein the first electrically conductive material is selected from titanium, platinum, tungsten, tantalum, niobium and mixtures thereof.

6. The electrode assembly according to claim 4, wherein the second electrically conductive material is selected from copper, gold, silver and mixtures thereof.

7. The electrode assembly according to claim 1, wherein the layer of electrically conductive material is applied by sputter deposition.

8. The electrode assembly according to claim 1, wherein the electrode body is cut from a diamond wafer having a growth surface and a nucleation surface, the electrically conductive material being provided on the nucleation surface.

9. The electrode assembly according to claim 1, wherein the electrically conductive material extends over a major portion of the surface of the electrode body, with an edge portion not being covered in the electrically conductive material.

10. The electrode assembly according to claim 1, wherein the insulating material comprises a nitride of hafnium, titanium or zirconium.

11. The electrode assembly according to claim 1, wherein the electrode body is provided with a layer of resin.

12. The electrode assembly according to claim 1, wherein the electrode body is an elongate electrode body having first and second opposing edge surfaces and opposing first and second major faces extending between the first and second opposing edge surfaces;

wherein the electrode body has an elongate longitudinal axis;

wherein the electrode body comprises:

a first body portion having a first width measured in a direction perpendicular to the longitudinal axis and between the longitudinal axis and the first edge surface across the first and second opposing major surfaces; and     a second body portion having a second width measured in a direction perpendicular to the longitudinal axis and between the longitudinal axis and the first edge surface across the first and second opposing major surfaces;

wherein the second width is greater than the first width.

13. The electrode assembly according to claim 12, wherein the electrode body comprises a plurality of first body portions and a plurality of second body portions.

14. The electrode assembly according to claim 12, wherein the first and/or the second body portions are rectangular in shape.

\* \* \* \* \*